United States Patent

[11] 3,568,092

[72] Inventor Ronald P. Kluss
Santa Barbara, Calif.
[21] Appl. No. 020,306
[22] Filed Mar. 17, 1970
Continuation-in-part of application Ser. No. 694,726, Jan. 2, 1968, now abandoned.
[45] Patented Mar. 2, 1971
[73] Assignee Spectrum Technology, Inc.
Goleta, Calif.

[54] OSCILLATOR DRIVER
7 Claims, 14 Drawing Figs.

[52] U.S. Cl. .......... 331/116, 58/23, 331/156
[51] Int. Cl. .......... H03b 5/36
[50] Field of Search .......... 331/116, 156; 58/23

*Primary Examiner*—John Kominski
*Attorney*—Smyth, Roston & Pavitt

ABSTRACT: A circuit for use as regenerative drive circuit for mechanical resonator, using two complementary transistors, the base of each connected to the emitter of the respective other one for forming a loop which includes a sensing coil. The collector-emitter path of one of the transistors includes a drive coil.

Figures 1, 2, 3:
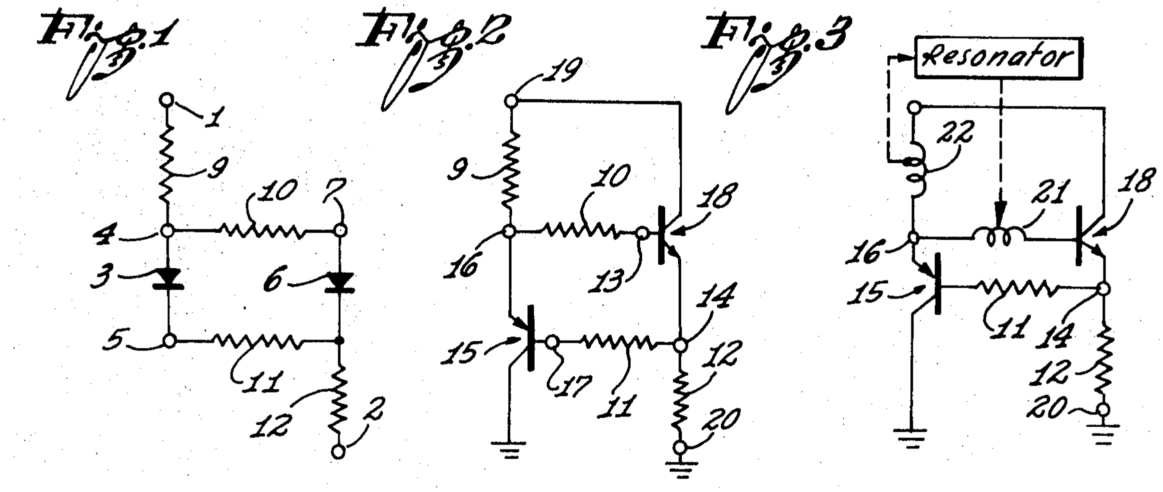

INVENTOR.
Ronald P. Kluss

By Smyth, Roston & Pavitt
ATTORNEYS

INVENTOR.
Ronald P. Kluss

By Smyth, Roston & Pavitt
ATTORNEYS

OSCILLATOR DRIVER

This application is a continuation-in-part of Ser. No. 694,726, filed Jan. 2, 1968, now abandoned.

The present invention relates to an oscillator system preferably of the type cooperating with a mechanical resonator, in a regenerative feedback loop, there being a first impedance such as an inductor to serve as sensing or pickup means providing signals in representation of the instantaneous state of the resonator and there being a second impedance such as a second inductor to serve as agitator or driver for the resonator. The invention more particularly relates to the circuit interconnecting the sensor or pickup means with the agitator or driving means.

The invention will find particular utility in mechanical resonators, for example, of the tuning fork type. Tuning forks with pickup coil, driver coil and regenerative circuitry interconnecting pickup and driver coils are, for example, disclosed in U.S. Pat. Nos. 2,574,188; 2,971,104 and 3,085,168. The invention suggests improvements which find particularly advantageous utility in the regenerative circuitry for such tuning fork system.

The circuit in accordance with the invention is designed particularly for compensating temperature and input voltage variations, without requiring components whose precision is critical. The circuit in accordance with the invention is designed to establish and to maintain symmetrical output for the driver, whereby voltage and temperature variations are not to disturb that symmetry.

In accordance with the present invention it is suggested to provide a pair of complementary transistors, there being an NPN and PNP transistor accordingly. The base electrode of the NPN transistor is connected to the emitter electrode of the PNP transistor by first DC connecting means and the base electrode of the PNP transistor is connected to the emitter electrode of the NPN transistor by a second DC connecting means. At least one of these two DC connecting means includes as impedance a sensor or pickup means, preferably an inductor coupled to the mechanical resonator, such as a tuning fork or the like, to introduce variable current into the respective base electrode, in synchronism with the oscillation of the resonator. Circuit means are provided connecting the emitter-collector path of the NPN transistor between first and second sources of potential, and additional circuit means are provided connecting the collector-emitter path of the PNP transistor between these two sources of potential so that the collector of the PNP transistor and the emitter of the NPN transistor connected to the same source of potential, the remaining collector and emitter electrodes of the two transistors connecting to the other source of potential accordingly. At least one of these electric circuit means now includes the impedance that is to serve as driver or agitator for the mechanical resonator.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIG. 1 is a schematic diagram of a circuit illustrating the voltage drop across two diodes connected in parallel, the circuit is used to begin developing the concept of the present invention;

FIG. 2 is a schematic diagram showing a further step in developing the concept of the present invention and representing in essence the D.C. bias conditions for the circuits in accordance with the present invention; and FIGS. 3 through 14 are different circuit diagrams illustrating the different examples for practicing the invention wherein the diagram for FIG. 3 shows the preferred embodiment for practicing the present invention.

Turning now to the detailed description of the drawings, there are illustrated in FIG. 1 two sources of voltage potentials 1 and 2, there being a plurality of circuit elements interconnected between these two sources. A resistor 9 connects to source terminal 1 and is in turn connected to a diode 3 and to a resistor 10 forming a common junction or circuit point 4. Resistor 10 is connected in series with a diode 6 and a resistor 11 interconnects the cathodes of the two diodes 3 and 6, forming a junction 8 which is connected to source terminal 2 via a resistor 12. As voltage is applied between the two terminals 1 and 2 (terminal 1 more positive) current flow results through resistor 9 and into the first branch which includes resistor 10 and diode 6, as well as into the second branch of diode 3 and resistor 11. The currents combine at point 8 and current flow continues through resistor 12 to the source of potential 2. Therefore, during operation there results a voltage drop across resistor 9, and another voltage drop across resistor 12. Additional drops occur across resistors 10 and 11 as well as across diodes 3 and 6 but in forward direction. The voltage drops across the diodes remain relatively constant due to their characteristics. Also, if the temperature changes, the currents through the two branches vary in the same direction.

Turning now to FIG. 2, there are illustrated again two sources of potential, one is represented by terminal 19, and it is assumed that positive potential is applied to that terminal. The other source of potential is ground and is represented by terminal 20. The circuit includes a PNP transistor 15 having its collector connected to ground, and its emitter is connected via resistor 9 to terminal 19. Next, there is an NPN transistor 18 having its collector connected to terminal 19 and its emitter is connected to ground via the resistor 12.

The emitter of PNP transistor 15 is additionally connected through resistor 10 to base terminal 13 of NPN transistor 18. The emitter of NPN transistor 18 is connected via a resistor 11 to base terminal 17 of PNP transistor 15. The connection point of resistors 11 and 12 and of transistor 18 is denoted with reference numeral 14.

As positive voltage is applied to terminal 19, the voltage across points 13 and 14 supplies a forward bias for NPN transistor 15 while the voltage across points 16 and 17 supplies a forward bias for NPN transistor 18. Transistors 15 and 18 are, therefore,, rendered conductive and the voltage drops across resistors 9 and 12 tend to increase. As the voltage drop across resistor 12 increases the base bias for transistor 15 tends to decrease since the potential at point 14 will move towards a more positive potential. As the voltage across regіster resistor 9 increases, transistor 18 bias tends to decrease since the potential of point 16 will move towards the ground potential of terminal 20.

The voltages across resistors 9 and 12 and the conduction through the transistors will soon reach a state of equilibrium, determined primarily by the relative values of the fixed resistances in the circuit as well as by the relative beta of the transistors employed. As temperature and voltage changes occur the transistor parameters such as beta and leakage currents can be expected to change by almost equal percentages so that the ratio mains relatively constant and the effect on the operating points of the transistors are substantially cancelled due to the circuit configuration chosen. One can, therefore, see that the D.C. bias conditions within the circuit tend to stabilize around a particular operating point. Moreover, the closer transistors 15 and 18 match, the better is the degree of stabilization.

As it can be seen a loop is established, for example from point 16, across resistor 10, base-emitter diode of transistor 18, across resistor 11 and back to 16 through the base-emitter diode of transistor 15. As the two base-emitter diodes are both biased in forward direction, an A.C. signal can circulate in that loop. That loop is to be used for introducing a sensed signal into the circuit. Such a signal will be amplified by the transistors employed, and an amplified driver output signal can be taken from either of the two emitter circuits or from either of the two collector circuits, i.e., from across resistor 9, or 12, or from the collectors of transistors 15 or 18.

Turning now to the description of the particular embodiments of the invention, reference is made first to FIG. 3 which illustrates substitution of some of the resistors in the circuit of FIG. 2 by inductances. However, particularly the inductance in the emitter circuit of transistor 15 includes resistance or equivalent resistance of resistor 9 to obtain particular DC voltage drop thereacross. Thus, the D.C. bias conditions are to be as outlined with reference to FIG. 2. In FIG. 3 there is illustrated a sensing or pickup coil or inductor 21 interconnecting the base electrode of transistor 18 with the emitter electrode of transistor 15. This inductor 21 is coupled to a mechanical resonator system such as a tine of a tuning fork or the like and in such a manner that upon oscillation of that resonator an A.C. voltage is induced across inductor 21.

The emitter electrode of PNP transistor 15 is connected to a second inductor or driver coil 22, likewise coupled to the resonator and serving as driver and agitator to provide, in essence, mechanical energy to the resonator. For convenience it may be assumed that the D.C. current resistances of the coils 21 and 22 are equal to the D.C. resistances of resistors 10 and 9 respectively in FIG. 2 so that the current operating points remain the same as explained in FIG. 2.

In view of the fact that the emitter base diode of the transistors 15 and 18 are forwardly biased by operation of the D.C. biasing as was explained above, an A.C. current path exists for the A.C. current induced in the coil 21, running particularly through the base-emitter diode of transistor 18, through resistor 15 back to the other end of coil 21. It may be assumed that at any instant the voltage across inductor 21 increases, to be more positive at the base of NPN transistor 18 than established by the D.C. bias. As a consequence, additional current flows from the base to the emitter of transistor 18 and back through resistor 11 and through the emitter diode of transistor 15. That current seems to flow through the base emitter path of transistor 15 in opposite direction than permissible but, as stated above, that base emitter diode is biased in forward direction by D.C. biasing operation.

That induced signal input current times the beta of transistor 18 flows through the collector-emitter path of that transistor and, therefore, across resistor 12. Accordingly, the point 14 is taken more positive. The same induced signal input current controls transistor 15 by causing decrease in the emitter current thereof; accordingly the current through coil 22 will decrease and point 16 will likewise go more positive. The potentials of points 14 and 16 both rise and progressively assume a new equilibrium as the change in current as induced in coil 21 is comparatively slow. Thus, the potential of these points track each other at any instant.

The emitter current of transistor 15 as passing through driver coil 22 decreases in proportion to the induced sensing current and as flowing reversely across the base-emitter diode of transistor 15, times the relative beta thereof. The current in the coils 21 and 23, thus, are in phase opposition. Analogously then, as the induced sensing current reverses, the driver current increases in proportion and in accordance with the beta of the emitter follower operation of transistor 15. Therefore, drive pulses having magnitude as determined by the characteristics of the transistors are periodically developed in coil 22 and imparted upon the resonator. The resonator maintains the frequency of the system constant, which is reflected into the system by periodic stimulation of coil 21 in synchronism with the resonator and at constant frequency.

As the resonator coupled to the two coils oscillates, transistors 15 and 18 undergo periodic variations in conduction. The coils are arranged in regenerative circuit relationship, and the circuit has positive gain, which outweighs circuit losses. The transistors may well be driven into saturation as their state or degree of conduction varies in opposite direction during oscillation of the resonator and during corresponding variations in the induced current in sensor coil 21. If the D.C. is selected to be in about the midpoint of saturation and cutoff of each of the two transistors the drive signals will be symmetrical in contour, whereby the current level through coil 22 for zero input of the sensing coil establishes the reference line for that symmetry. The emitter follower operation of transistor 18 is useful particularly in that it inhibits cancelling of the effect of the induced signal input voltage across coil 21 and as used to control the emitter follower operation of driver stage transistor 15.

Figures 4, 5, 6:
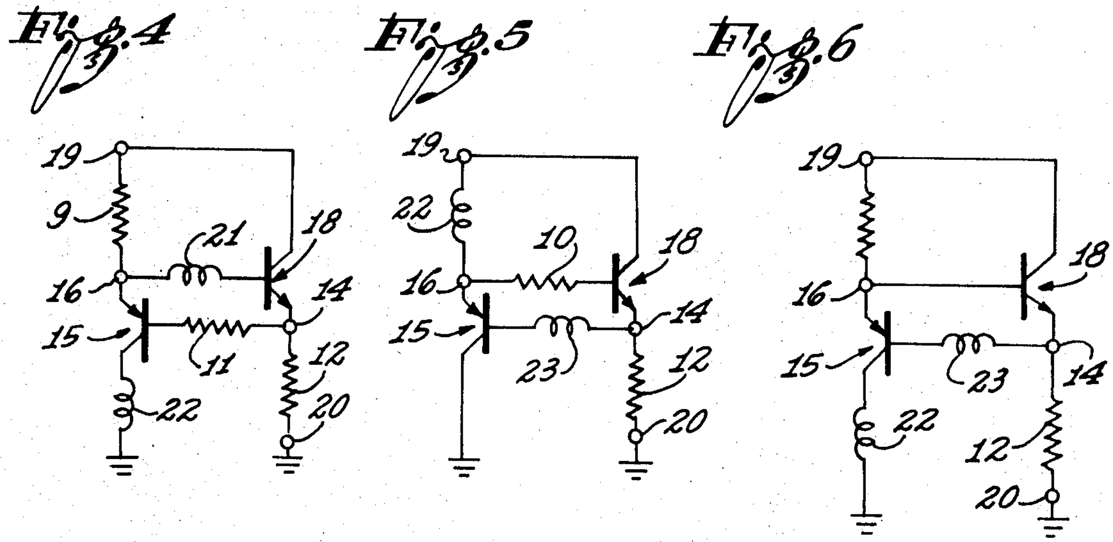

Since it is the current in the emitter-collector path of transistor 15 that is used as the driver current, the coil itself could be connected between collector electrode of transistor 15 and ground as shown in FIG. 4 except that in this case coil 22 cannot assume the additional function of the emitter circuit resistance. Thus, resistor 9 is specifically included in the circuit of FIG. 4. FIG. 5 illustrates another modification of the circuit of FIG. 3 showing that the sensor coil, here denoted with reference numeral 23, is connected in the base circuit of transistor 15 rather than in the base circuit of transistor 18, the latter now including the resistor 10. However, the operations of transistors 15 and 18 are reversed to each other.

As evidenced by the circuit of FIG. 6 it can be seen that resistor 10 essentially is a small one and can in fact be omitted so that the closed current path for the current induced in the sensor coil includes low resistance. Analogously, there can be a direct connection of the base electrode of transistor 15 to point 14, omitting resistor 11 when the sensing coil is connected between 16 and the base 13.

Figures 7, 8:
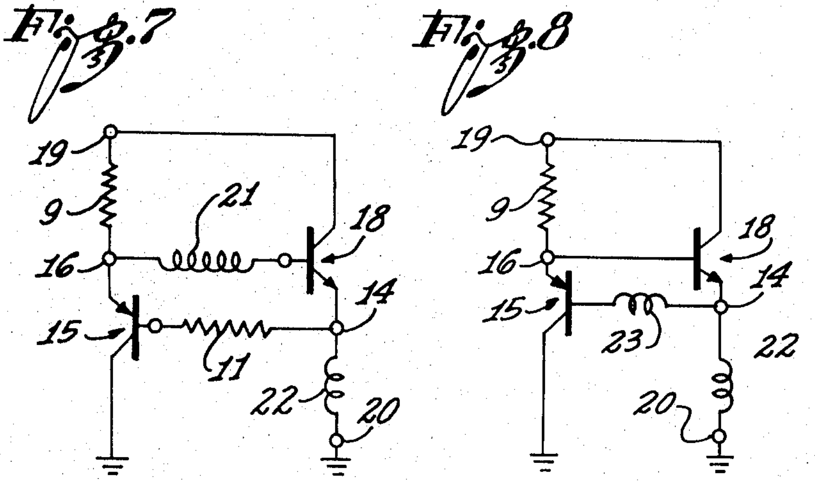

The driver coil 22 can be included in the circuit that it connected in series with the emitter collector path of transistor 18. This is illustrated representatively in FIG. 7, showing the coil 22 to be connected between emitter of transistor 18 and ground whereby that particular coil is regarded as having sufficient resistance to include the function of resistor 12. The circuit in FIG. 8 is similar to the circuit shown in FIG. 7 as far as placement of the driver coil 22 is concerned. However, the sensing coil 23 is connected here between the base of transistor 15 and the emitter of transistor 18, while resistor 10 is emitted omitted.

Figure 9:
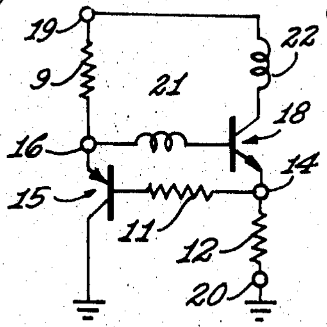
Figure 10:
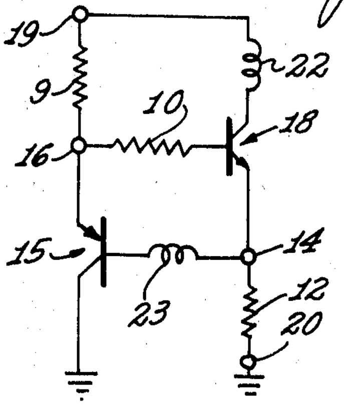

In the embodiment shown in FIG. 9 the driver coil 22 is connected between the collector of transistor 18 and the source of positive potential 19; however, in this case the coil 22 does not include significant resistance. FIG. 10 illustrates an arrangement in which the driver coil is also connected to the collector of transistor 18 while the sensor coil 23 is connected in the base circuit of transistor 15.

To summarize: it can thus be seen, that in one of the two base circuits, there is connected a sensor coil, 22 or 23, inducing an A.C. current which flows also through the respective other base circuit including a resistor, 11 or 10, or even no resistor at all. This way the two transistors change condition in opposite directions. One of the two transistors controls the driver current in response to the induced pickup current. While the emitter of the respective other transistor, through the loop action, tracks the emitter of the driver transistor and offsets the negative feedback caused by the resistance in the emitter of the driver transistor.

Figure 11:
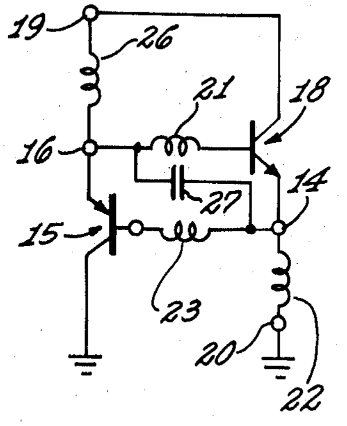
Figure 12:
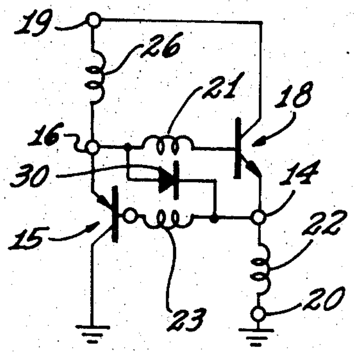
Figure 13:
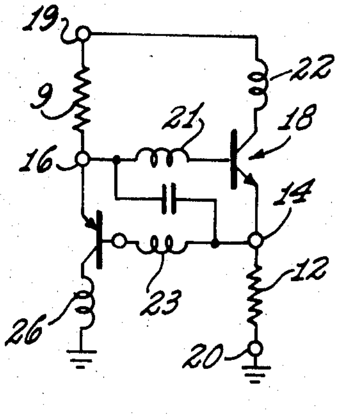
Figure 14:
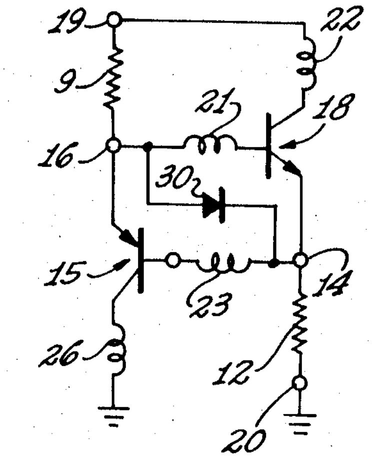

FIG. 11 illustrates the principle that two different resonators can be operated by the same circuit, one resonator having coils 21 and 22 respectively as sensor and driver, and the other having coils 23 and 26 respectively as sensor and driver connected as illustrated. Without further measures, there is considerable intercoupling between the circuit, possibly causing degeneration of one by the other. Thus, a high degree of dynamic balance must be obtained so that the activity of one resonator does not suppress the activity of the other. A.C. isolation of each half of the circuit can obtained, for example, by interconnecting the two emitters of the two transistors 15 and 18 through a capacitor 27. Alternatively, a diode 30 can be connected between the two emitters as shown in FIG. 12. That diode is D.C. biased in forward direction and can, therefore, be transversed by A.C. current. Capacitor 27 and diode 30 in effect establish separate loops for each of the two sensor coil circuits. FIGS. 13 and 14 differ respectively from FIGS. 11 and 12 in the connection of the driver coils along the principles expounded above.

It can readily be seen that the various circuits may be subject to additional modifications. For example, the NPN and PNP transistors could be interchanged while terminal 19 receives negative rather than positive potential.

The invention is not limited to the embodiments described above, but all changes and modifications thereof not constituting departures from the spirit and scope of the invention are intended to be covered by the following claims.

I claim:

1. In an oscillator a circuit having an input impedance and an output impedance, the impedances being externally coupled whereby the output impedance operates as a driver and the input impedance senses the result of the driver operation as provided by the output means, there being a first source of potential and a second source of potential, the combination comprising:
an NPN transistor and a PNP transistor each having base emitter and collector electrodes;
first D.C. connecting means connecting the base electrode of the NPN transistor to the emitter electrode of the PNP transistor;
second D.C. connecting means connecting the base electrode of the PNP transistor to the emitter electrode of the NPN transistor, the input impedance being included in at least one of the first and second D.C. connecting means to introduce a variable current into the respective connected means resulting from the operation of the driver operation as provided by the output impedance, the current path for the variable current being closed through the emitter-base paths of the transistor and the other one of the two connecting means;
third means connecting the collector electrode of the NPN transistor to the first source of potential;
fourth means connecting the emitter electrode of the PNP transistor to the first source of potential;
fifth means connecting the emitter electrode of the NPN transistor to the second source of potential;
and sixth means connecting the collector electrode of the PNP transistor to the second source of potential, the output impedance means being included in at least one of the third through sixth means.

2. In an oscillator there being first and second inductor means for coupling to a mechanical resonator, the first inductor means to serve as agitator, the second inductor means to serve as sensor, there being a first source of potential and a second source of potential comprising:
an NPN and a PNP transistor each having base collector and emitter electrodes;
first D.C. connecting means connecting the base electrode of the NPN transistor to the emitter electrode of the PNP transistor;
second D.C. connecting means connecting the base electrode of the PNP transistor to the emitter electrode of the NPN transistor, the second inductor means being includes in at least one of the first and second D.C. connecting means;
third circuit means connecting the emitter-collector path of the NPN transistor between the first and second sources of potential;
and fourth circuit means connecting the collector-emitter path of the PNP transistor between the first and second sources of potential so that the collector of the PNP transistor and the emitter of the NPN transistor connect to the first source of potential, and the remaining collector and emitter electrodes connect to the second source of potential each of the third and fourth means including resistive means, the first inductor means being included in at least one of the third and fourth means.

3. An oscillator circuit as in claim 2, one of the D.C. connecting means including the second inductor means and the other D.C. connecting means providing a direct base-to-emitter connection.

4. An oscillator circuit as in claim 2, one of the D.C. connecting means including the second inductor, the other D.C. connecting means including a resistor.

5. An oscillator circuit as in claim 2, the second inductor includes the first D.C. connecting means, a fourth inductor included in the second D.C. connecting means; the first inductor included in one of the third and fourth means, a third inductor included in the other one of the third and fourth means, the third and fourth inductor means pertaining to a second resonator 6. An oscillator circuit as in claim 5, there being a capacitor connected between the emitter electrodes of the PNP and the NPN transistors.

7. An oscillator circuit as in claim 5, there being a diode connected between the emitter electrodes of the PNP and the NPN transistors, at a polarity for forward D.C. bias by operation of the polarity relation of the first and second sources of potential.